(12) United States Patent
Wang

(10) Patent No.: US 12,504,331 B2
(45) Date of Patent: Dec. 23, 2025

(54) SINGLE-PIN WIRELESS ELECTRONIC THERMOMETER AND CHARGING DEVICE FOR THE SAME

(71) Applicant: Finemold Technologies Co., Ltd, Guangdong (CN)

(72) Inventor: Baohong Wang, Guangdong (CN)

(73) Assignee: Finemold Technologies Co., Ltd, Guangdong (CN)

( * ) Notice: Subject to any disclaimer, the term of this patent is extended or adjusted under 35 U.S.C. 154(b) by 720 days.

(21) Appl. No.: 17/584,422

(22) Filed: Jan. 26, 2022

(65) Prior Publication Data

US 2023/0213392 A1    Jul. 6, 2023

(30) Foreign Application Priority Data

Dec. 31, 2021    (CN) .......................... 202123448884.1

(51) Int. Cl.
*G01K 1/14*    (2021.01)
*G01K 1/08*    (2021.01)
*H02J 7/00*    (2006.01)

(52) U.S. Cl.
CPC ................. *G01K 1/14* (2013.01); *G01K 1/08* (2013.01); *H02J 7/0045* (2013.01)

(58) Field of Classification Search
CPC ............ G01K 1/14; G01K 1/08; G01K 1/024; G01K 1/16; G01K 2207/06; H02J 7/0045
USPC ......................................................... 374/175
See application file for complete search history.

(56) References Cited

U.S. PATENT DOCUMENTS

| 11,920,984 | B2 * | 3/2024 | Lion | G01K 1/024 |
| 2011/0118623 | A1 * | 5/2011 | Nakanishi | |
| 2016/0255997 | A1 * | 9/2016 | Romandy | H01R 13/73 |
| 2019/0339133 | A1 * | 11/2019 | Pulvermacher | G01K 1/022 |
| 2023/0086509 | A1 * | 3/2023 | Guo | A47J 36/32 374/208 |

FOREIGN PATENT DOCUMENTS

| CN | 113483909 A | * 10/2021 | G01K 7/16 |
| CN | 113758597 A | * 12/2021 | G01K 7/22 |
| WO | WO-2022101846 A1 | * 5/2022 | G01K 1/024 |

* cited by examiner

*Primary Examiner* — Paul M. West
*Assistant Examiner* — Evan Mancini
(74) *Attorney, Agent, or Firm* — Ricky Lam

(57) ABSTRACT

Disclosed are a single-pin wireless electronic thermometer and a charging device for the same. The single-pin wireless electronic thermometer includes a temperature measuring body with an inner cavity, and one end of the temperature measuring body is connected with an insertion part for inserting into food, a temperature sensor for detecting an internal temperature of the food is arranged inside at least the temperature measuring body or the insertion part, a temperature sensing portion of the temperature sensor is fitted to an inner wall of the temperature measuring body or an inner wall of the insertion part, and a control board is arranged in the inner cavity and connected to the temperature sensor. The single-pin wireless electronic thermometer of the present disclosure has a compact structure, with faster and more accurate heat conduction, so that the measuring effect may be improved.

9 Claims, 4 Drawing Sheets

SINGLE-PIN WIRELESS ELECTRONIC THERMOMETER AND CHARGING DEVICE FOR THE SAME

CROSS REFERENCE TO RELATED APPLICATION

The present application claims priority from Chinese patent application No. 202123448884.1 filed on Dec. 31, 2021, the entire content of which is incorporated herein by reference.

TECHNICAL FIELD

The present disclosure relates to temperature measuring equipment for food, in particular, to a single-pin wireless electronic thermometer and a charging device for the same.

BACKGROUND TECHNOLOGY

Food thermometers are used for measuring the temperature of food, in order to control the heat and the cooking time to prevent the food from being overcooked and losing its taste.

Existing electronic thermometers basically include two portions: a probe portion and a main portion. The probe portion has a built-in temperature sensor, and is mainly used to be inserted into the object to be measured. The main portion includes a circuit board, a display screen, a battery and the like, and its main function is to process the data transmitted by the temperature sensor and display the temperature. Although this conventional structure is widely used, however, the structure has a relatively large size, and is relatively complex, moreover, the gap between the temperature sensor and the inner wall of the main body results in slow heat conduction, poor measurement accuracy, and inconvenience in use.

SUMMARY

An objective of the present disclosure is to provide a single-pin wireless electronic thermometer to solve the above-mentioned problems that the existing electronic thermometers have a large size and a complex structure which lead to slow heat conduction and poor measurement accuracy, causing inconvenience in use.

Another objective of the present disclosure is to provide a charging device for the electronic thermometer through which the electronic thermometer is charged, so as to be capable of carrying out, recycling the battery, and being environmental friendly.

In order to achieve the above objectives, the present disclosure provides:

A single-pin wireless electronic thermometer, which includes a temperature measuring body with an inner cavity, and one end of the temperature measuring body is connected with an insertion part for inserting into food, a temperature sensor for detecting an internal temperature of the food is arranged inside at least the temperature measuring body or the insertion part, a temperature sensing portion of the temperature sensor is fitted to an inner wall of the temperature measuring body or an inner wall of the insertion part, and a control board is arranged in the inner cavity and connected to the temperature sensor.

Preferably, a charging contact extending out of the temperature measuring body is connected to an end of the control board away from the insertion part.

Preferably, an antenna module is printed on the control board, and the control board is in wireless connection with a mobile terminal through the antenna module, and an insulating casing made of a non-metallic material is provided on the temperature measuring body corresponding to the antenna module.

Preferably, the antenna module is located at the end of the control board away from the insertion part, and the insulating casing is connected with an end of the temperature measuring body away from the insertion part.

Preferably, the insulating casing is made of a heat-resistant material, and includes an insulating tube integrally connected with the temperature measuring body, and a sealing cover removably connected to an end of the insulating tube away from the temperature measuring body; the control board extends to an inner wall of the sealing cover and is connected with the sealing cover through the charging contact, and the charging contact extends out of the sealing cover.

Preferably, the insulating casing is removably connected with the temperature measuring body.

Preferably, the insertion part has a hollow tapered structure that is easy to be inserted into the food and integrally connected to the one end of the temperature measuring body; the temperature measuring body and the insertion part are both made of stainless steel.

Preferably, a sensor bracket is further arranged inside the inner cavity at an end close to the insertion part, and a sensor accommodating groove for accommodating the temperature sensor is provided on an outer peripheral surface of the sensor bracket, and the temperature sensor is abutted against an inner wall of the inner cavity through the sensor bracket.

Preferably, a power supply module electrically connected with the control board is fixed on one side of the sensor bracket.

Preferably, the power supply module includes one of a battery, a super capacitor, and a lithium ion capacitor.

A charging device for an electronic thermometer, used for charging the above-mentioned electronic thermometer, the charging device includes a charging base and a power supply electrically connected with the charging base; the charging base has a charging accommodating recess for accommodating the electronic thermometer, and a charging contact for charging the electronic thermometer.

The single-pin wireless electronic thermometer with above-mentioned structure in the present disclosure is advantageous in that: during cooking, the electronic thermometer is inserted into the food by holding the temperature measuring body and inserting the insertion part into the center of the food. The specific temperature of the food is detected by the temperature sensor, and the value is transmitted to the control panel, which is then transmitted to the mobile terminal (mobile phone, tablet or laptop), so that a current internal temperature of the food and remaining time of heating to a preset temperature is obtained on the mobile terminal. The temperature sensing portion of the temperature sensor is fitted with the inner wall of the insertion part, such that the heat conduction is faster and more accurate. The single-pin wireless electronic thermometer of the present disclosure has a compact structure such that it is easy to carry and use. Compared with the existing electronic thermometers which have a gap between the temperature sensor and the inner wall of the insertion part, the temperature sensing portion of the temperature sensor is fitted to the inner wall of the insertion part in the present disclosure, so that the heat conduction may be faster and more accurate, and the measuring effect may be improved. Furthermore, compared with the existing electronic thermometers with a fixed integral structure, the electronic thermometer in the present disclosure is easy to disassemble and assemble, thereby being convenient for production and maintenance.

The charging device for an electronic thermometer is further provided by the present disclosure, the electronic thermometer is charged by the charging device, so as to be capable of carrying out, recycling the battery, and being environmental friendly.

BRIEF DESCRIPTION OF THE DRAWINGS

In order to more clearly illustrate the embodiments of the present disclosure or the existing technology in the prior art, the accompanying drawings will be briefly described below. Obviously, the accompanying drawings in the description below are merely some embodiments of the present disclosure, and for those of ordinary skill in the art, other drawings can also be obtained according to the structures shown in these drawings without creative efforts.

Figure 1:
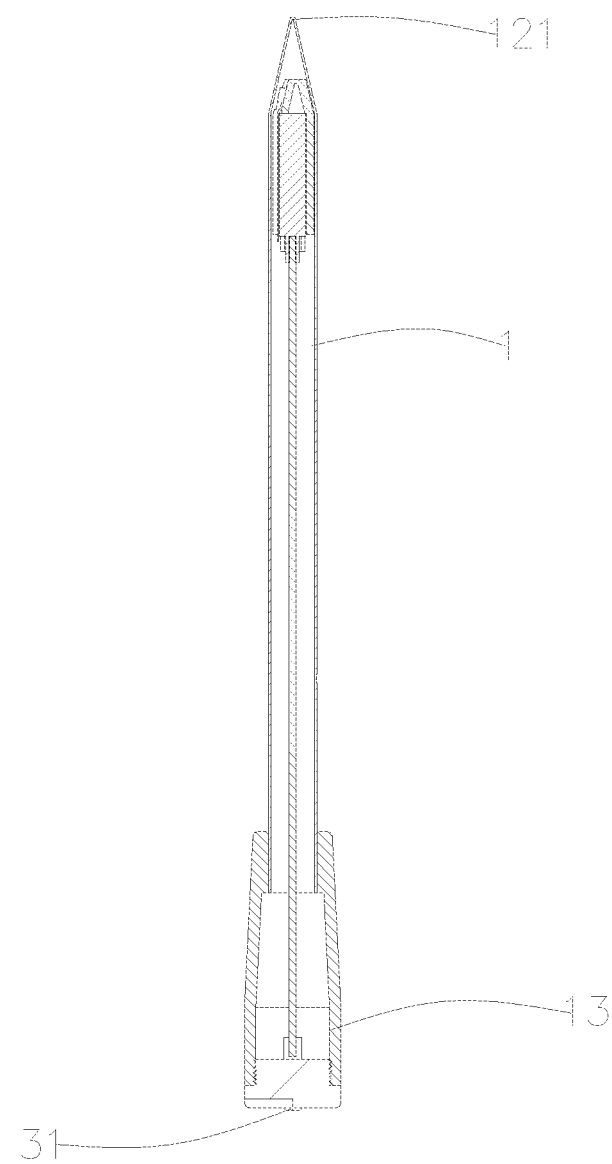
FIG. 1 is a sectional structural view of the electronic thermometer of the present disclosure.

REFERENCE SIGNS electronic thermometer 1, temperature measuring body 11, insertion part 12, temperature sensor 2, control board 3, charging contact 31, first metal contact 311, second metal contact 312, insulating casing 13, insulating tube 131, sealing cover 132, engaging protrusion 111, thickening portion 133, slim portion 134, limiting protrusion 1341, engaging groove 135, sensor bracket 4, power supply module 5, sensor accommodating groove 41, safety line 112, probe 121, charging device 5, charging base 51, power supply 52, charging accommodating recess 511, contacting contact 512.

DESCRIPTION OF THE EMBODIMENTS

The present disclosure will be further described below in conjunction with the accompanying drawings and embodiments in order to enable those of ordinary skill in the art to more clearly understand the objectives, technical proposals, and advantages of the present disclosure.

In the description of the present disclosure, it should be understood that the terms "center", "top", "bottom", "inner", "outer", etc. indicate spatial relationship that is based on the orientation or positional relationship shown in the drawings, and is only for describing the present disclosure and simplifying the description, rather than indicating or implying that the device or element referred to must have a specific orientation and be constructed and operated in a specific orientation, therefore these cannot be understood as a limitation to the present disclosure. Therefore, the features defined as "first" and "second" may explicitly or implicitly include one or more of the features. In the description of the present disclosure, the meaning of "plurality" is two or more, unless otherwise specified.

In the present disclosure, unless otherwise clearly specified and limited, the terms "installed", "connect", "connected", "fixed" and other terms should be interpreted as broad meaning, for example, it may be connected or detachably connected, or formed into one entity; it may be a physical connection or electrical connection; it may be directly connected, or indirectly connected through an intermediate medium; it may be an internal communication or interaction between two elements. Those skilled in the art can understand the specific meanings of the above terms in the present disclosure according to specific situations.

In the present disclosure, unless otherwise clearly specified and defined, the first feature "above" or "below" the second feature may include the direct contact of the first and second feature, or may include the first and second features not in direct contact but through another feature therebetween. Moreover, the first feature is "on", "above" and "over" the second feature includes that the first feature is directly above and obliquely above the second feature, or simply means that the first feature is higher in level than the second feature. The first feature is "under", "below" and "underneath" the second feature includes that the first feature is directly below and obliquely below the second feature, or simply means that the first feature is lower in level than the second feature.

Figure 2:
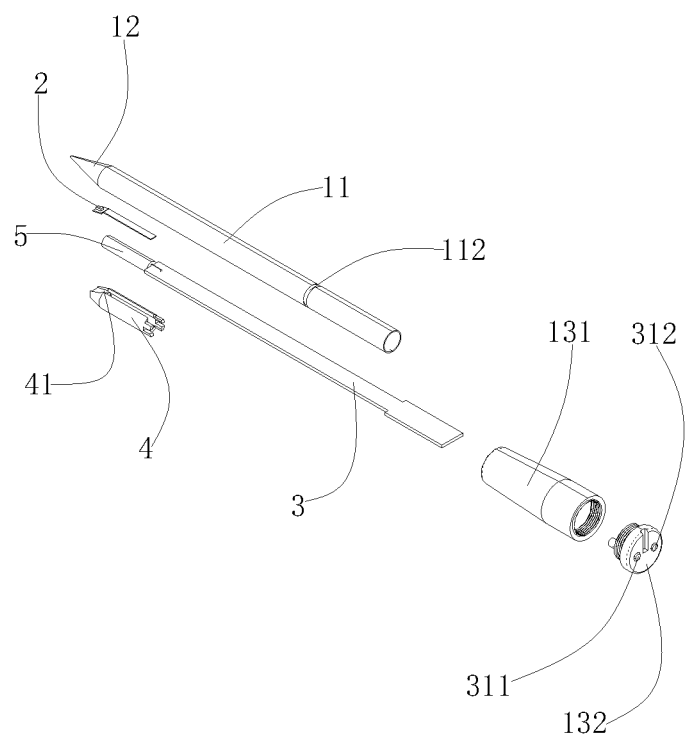
FIG. 2 is an exploded view of the electronic thermometer.

Embodiment 1: as shown in FIGS. 1 and 2, a single-pin wireless electronic thermometer 1 provided by the present disclosure includes a temperature measuring body 11 with an inner cavity. In this embodiment, the temperature measuring body may be a hollow circular tube with openings at both ends, and may also have a square shape or a polygonal shape. One end of the temperature measuring body 11 is connected with an insertion part 12 for inserting into food, a temperature sensor 2 for detecting an internal temperature of the food is arranged inside at least the temperature measuring body 11 or the insertion part 12, a temperature sensing portion of the temperature sensor 2 is fitted to an inner wall of the temperature measuring body 11 or an inner wall of the insertion part 12, and a control board 3 is arranged in the inner cavity and connected to the temperature sensor 2.

Therefore, during cooking, the electronic thermometer 1 is inserted into the food by holding the temperature measuring body 11 and inserting the insertion part 12 into the center of the food. The specific temperature of the food is detected by the temperature sensor 2, and the value is transmitted to the control panel 3, which is then transmitted to a mobile terminal (mobile phone, tablet or laptop), so that a current internal temperature of the food and remaining time of heating to a preset temperature is obtained on the mobile terminal. The temperature sensing portion of the temperature sensor 2 is fitted with the inner wall of the insertion part 12, such that the heat conduction is faster and more accurate. The single-pin wireless electronic thermometer 1 of the present disclosure has a compact structure such that it is easy to carry and use. Compared with the existing electronic thermometers which have a gap between the temperature sensor and the inner wall of the insertion part, the temperature sensing portion of the temperature sensor 2 is fitted with the inner wall of the insertion part 12 in the present disclosure, so that the heat conduction may be faster and more accurate, and the measuring effect may be improved. Furthermore, compared with the existing electronic thermometers with a fixed integral structure, the electronic thermometer 1 in the present disclosure is easy to disassemble and assemble, thereby being convenient for production and maintenance. Specifically, the control board 3 includes a control chip and a wireless module. The temperature quantity is converted into an analog quantity or a digital quantity by the temperature sensor 2, and is then transmitted to the control chip, and the data is transmitted to the wireless module by the control chip and sent to the mobile terminal.

Furthermore, in order to charge the electronic thermometer 1, a charging contact 31 extending out of the temperature measuring body 11 is connected to an end of the control board 3 that is away from the insertion part 12. The charging contact 31 includes a first metal contact 311 and a second metal contact 312 that are connected to the end of the control board 3 and are used as positive and negative electrodes, respectively, and one end of the temperature measuring body 11 away from the insertion part 12 has a first pin and a second pin respectively corresponding to the first metal contact 311 and the second metal contact 312. Specifically, the first metal contact 311 and the second metal contact 312 may also be directly connected to the control board 3.

Specifically, an antenna module for temperature monitoring is printed on the control board 3, and the control board 3 is wirelessly connected to the mobile terminal through the antenna module. The user may check whether the temperature of the food reaches or exceeds the temperature threshold through the mobile terminal so as to estimate an approximate completion time. The mobile terminal includes a mobile phone, a tablet, and a laptop. More specifically, the wireless connection includes a Bluetooth connection, and other wireless connections such as Wi-Fi, Sub-G, and the like, which allows a convenient and simple connection between the electronic thermometer 1 and the mobile terminal. An insulating casing 13 made of a non-metal material is provided on the temperature measuring body 11 corresponding to the antenna module, which may avoid shielding of antenna signal caused by metals, and is easy to hold by the user.

Specifically, in order to reduce the influence of metals on the antenna module, the antenna module is located at one end of the control board 3 away from the insertion part 12, and the insulating casing 13 is connected to the one end of the temperature measuring body 11 away from the insertion part 12.

Specifically, the insulating casing 13 includes an insulating tube 131 integrally connected with the temperature measuring body 11, and a sealing cover 132 detachably connected to an end of the insulating tube 131 away from the temperature measuring body 11. The insulating tube 131 may be a circular, square or polygonal tube-like structure. In this embodiment, the insulating tube 131 is a hollow circular tube and is integrally connected to one end of the temperature measuring body 11. The sealing cover 132 has a circular shape, and is in detachable sealing connection with an end of the insulating tube 131 away from the temperature measuring body 11. The control board 3 extends to an inner wall of the sealing cover 132 and is connected with the sealing cover 132 through the charging contact 31, and the charging contact 31 extends out of the sealing cover 132. Specifically, the first metal contact 311 and the second metal contact 312 are integrally formed with the sealing cover 132 and then welded on the control board 3. The sealing cover 132 and the control board 3 are fixedly connected, so that the sensor is easier to be abutted on the inner wall of the insertion part. It is convenient to disassemble or assemble the temperature sensor and the control board through the sealing cover 132, thereby facilitating manufacturing or maintenance. Furthermore, the sealing cover 132 and the insulating tube 131 are in thread connection, and the temperature sensor 2 is fitted on the inner wall after the sealing cover 132 is screwed on the insulating tube 131. In other embodiments, the sealing cover 132 and insulating tube 131 may be in snap fitting.

Specifically, the insertion part 12 has a hollow tapered structure that is easy to be inserted into the food and integrally connected to one end of the temperature measuring body 11. Since the temperature measuring body 11 is a circular tube, in this embodiment, the insertion part 12 has a hollow conical shape. It may also be a hollow pyramid structure. The bottom surface of the insertion part 12 is connected with the end of the temperature measuring body 11 to form an integral structure. The temperature measuring body 11 and the insertion part 12 are made of stainless steel. Specifically, an end of the sensor bracket is tapered, so as to allow the sensor to be abutted on the inner wall of the insertion part 12. Specifically, the insertion part 12 includes a hollow tapered probe 121, which may be easily inserted into the food and allow a rapid heat conduction to the sensor. Furthermore, the temperature measuring body 11 and the insertion part 12 are made of food-grade 304 stainless steel, which is tough and durable.

Specifically, for the ease of assembling the temperature sensor 2 and other components, a sensor bracket 4 is further arranged inside the inner cavity at an end close to the insertion part 12, and a sensor accommodating groove 41 for accommodating the temperature sensor 2 is provided on an outer peripheral surface of the sensor bracket. The temperature sensor 2 is abutted on an inner wall of the inner cavity through the sensor bracket 4. In a specific embodiment, one end of the sensor bracket 4 is snapped with the control board, an end portion of the other end of the sensor bracket 4 has a tapered shape, and the temperature sensing portion of the temperature sensor 2 is located on an outer wall of the tapered part. Since one end of the control board 3 is fixedly connected with the sensor bracket 4 and the other end thereof is fixedly connected with the sealing cover 132, the tapered part of the sensor bracket 4 is in contact and fitted with the inner wall of the insertion part 12 when the sealing cover 132 is mounted, so that the heat conduction is faster and more accurate, and the measuring effect is improved.

Additionally, a power supply module 5 electrically connected to the control board 3 is fixed on one side of the sensor bracket 4, and the power supply module 5 may be one of a battery, a super capacitor, and a lithium ion capacitor. In this embodiment, the power supply module is a super capacitor. A capacitor accommodating groove for accommodating the power supply module 5 is formed on the end portion of the sensor bracket 4, and a fixing groove for fixing the control board 3 is also provided on the end portion of the sensor bracket 4, and one end of the control board 3 is inserted into the fixing groove to ensure the stability of the components of the electronic thermometer 1 during use.

Specifically, in order to prevent the risk of electric shock as the depth of the electronic thermometer is too deep, a safety line 112 is provided on an outer peripheral surface of the temperature measuring body 11. In this embodiment, the safety line 112 is used as a reference for the depth of insertion.

Specifically, the temperature sensor 2 includes a thermocouple, a resistance temperature sensor 2, a thermistor, an infrared or a semiconductor sensor.

Figure 5:
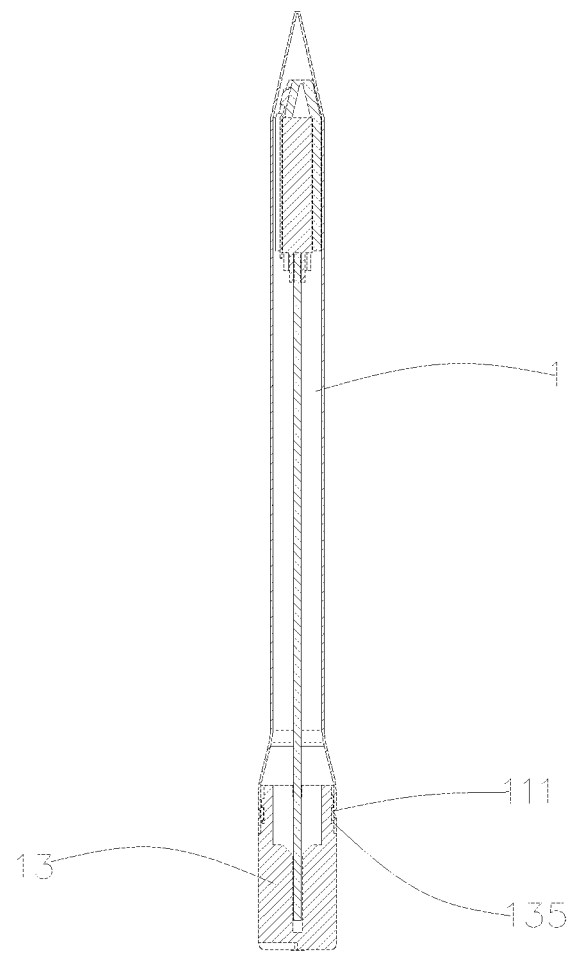
FIG. 5 is a sectional structural view of the electronic thermometer according to a second embodiment.
Figure 6:
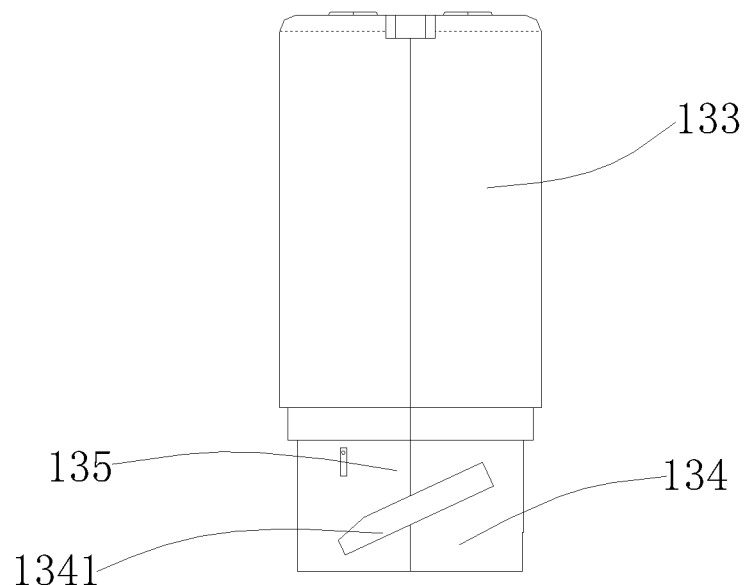
FIG. 6 is a structural view of the insulating casing according to the second embodiment.

Embodiment 2: this embodiment is generally the same as Embodiment 1, but differs in that, as shown in FIGS. 5 and 6, the insulating casing 13 and the temperature measuring body 11 are detachably connected though, for example, screw connection and snap fitting. Through the snap fitting, each component is assembled in the inner cavity of the temperature measuring body 11, and the insulating casing 13 may be easily and quickly connected to the temperature measuring body 11. The outer wall of the temperature measuring body 11 is recessed inward to form an engaging protrusion 111, so that the thickness of the temperature measuring body 11 is uniform. The insulating casing 13 includes a thickening portion 133 at one end of the temperature measuring body 11, and a slim portion 134 connected to one end of the thickening portion 133 and located in the inner cavity. A limiting protrusion 1341 is formed on an outer circumferential surface of the slim portion 134, and is gradually inclined upward along an axis of the slim portion 134. An engaging groove 135 is formed between the limiting protrusion 1341 and the thickening portion 133, and the engaging groove 135 has an entry opening at one end, and a limiting opening at the other end. An inner wall of the temperature measuring body 11 forms an engaging protrusion 111 protruding inward, and the limiting protrusion 1341 on the slim portion 134 is out of alignment from the engaging protrusion 111 before inserting into the inner cavity. The engaging protrusion 111 is positioned in the engaging groove 135 by rotation after entering the inner cavity, and the width of the engaging protrusion 111 is smaller than the width of the entry opening while larger than the width of the limiting opening, so that the engaging protrusion 111 is hindered from further rotation by the limiting opening. Specifically, in order to prevent the temperature measuring body 11 from falling off due to rotation and disengagement when the user holds the insulating casing 13, an anti-dropping mechanism is provided on a lower edge of the thickening portion 133, and the anti-dropping mechanism includes a stopper plate and a double torsion spring driving the stopper plate to reset. The stopper plate is arranged on a side of the entry opening. When the engaging protrusion 111 enters the engaging groove 135 along the predetermined path, a front section of the engaging protrusion 111 is abutted against the stopper plate, and the stopper plate rotates upward in a counterclockwise direction, and when the engaging protrusion 111 completely enters into the engaging groove 135, the stopper plate is then reset by the double torsion spring. When detaching is required, the engaging protrusion 111 is abutted against the stopper plate outward, and the stopper plate rotates upwards in a clockwise direction, and the stopper plate is reset by the double torsion spring when the engaging protrusion 111 is separated from the engaging groove 135. When the user holds the insulating casing 13, a predetermined amount of force is required to enable the engaging protrusion 111 to push and rotate the stopper plate, so that the connection between the insulating casing 13 and the temperature measuring body 11 may be more stable without detaching.

Figure 3:
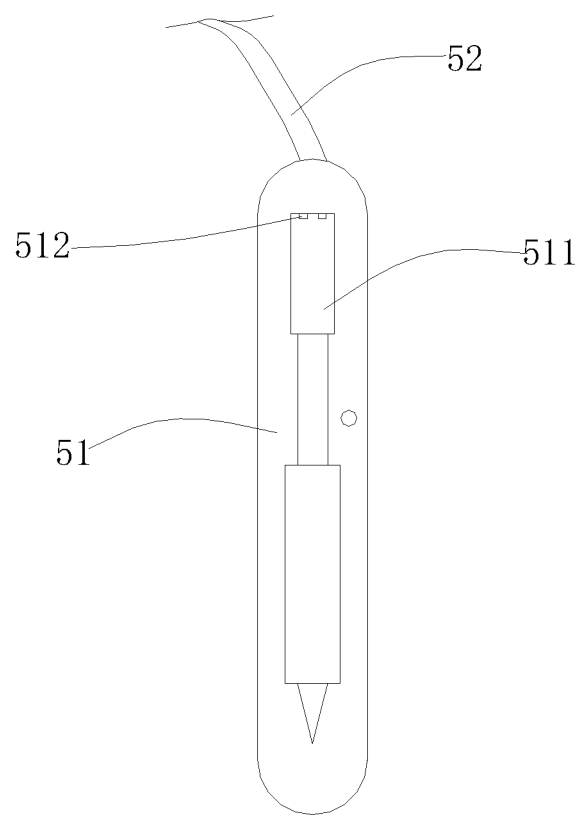
FIG. 3 is a structural view of the charging device of the present disclosure.
Figure 4:
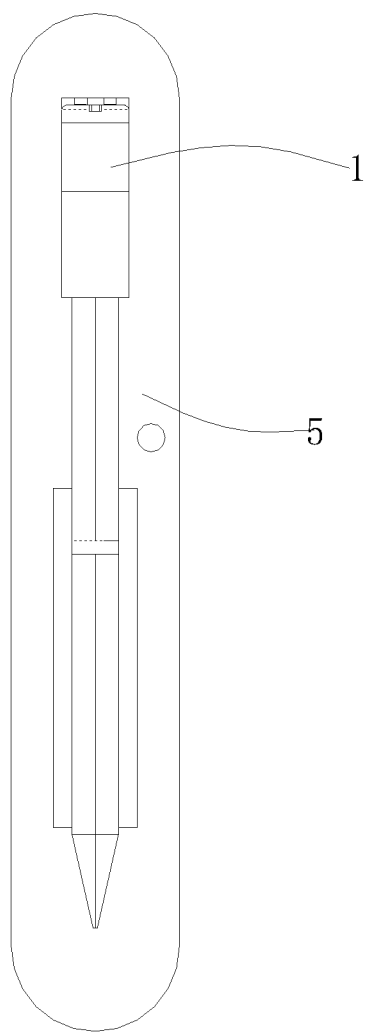
FIG. 4 is a schematic diagram showing a connection structure of the electronic thermometer and the charging device.

As shown in FIGS. 3 and 4, a charging device 5 for charging the electronic thermometer 1 includes a charging base 51 and a power supply 52 electrically connected to the charging base 51. The charging base 51 has a charging accommodating recess 511 for accommodating the electronic thermometer 1, and a contacting contact 512 for charging the electronic thermometer 1. The electronic thermometer 1 is placed in the accommodating recess 511. The contacting contact 512 includes a positive contact and a negative contact, the first metal contact 311 is connected to the positive contact, and the second metal contact 312 is connected to the negative contact. At the same time, in order to avoid a wrong connection between the contacts, a charging mark which is a vertical groove is formed on the sealing cover 132. When an opening of the vertical groove is vertically upward, the first metal contact 311 corresponds to the positive contact, and the second metal contact 312 corresponds to the negative contact. The charging accommodating recess 511 is has a shape matching the electronic thermometer 1.

Specifically, a battery compartment for installing batteries to charge the power supply module 5 is provided at a bottom part of the charging base 51, which allows carrying outdoors without wires. A charging indicator light for indicating the charging state is provided on the charging base 51.

The above descriptions are merely preferred embodiments of the present disclosure, and are not intended to limit the present disclosure. Various equivalent changes and modifications may be made by those skilled in the art on the basis of the above-mentioned embodiments, and all equivalent changes or modifications made within the scope of the claims shall fall within the scope of protection of the present disclosure. Therefore, the scope of protection of the present disclosure is defined by appended claims.

What is claimed is:

1. A single-pin wireless electronic thermometer, comprising a temperature measuring body with an inner cavity and an insulating casing made of a non-metallic material connected with the temperature measuring body, wherein one end of the temperature measuring body is connected with an insertion part for inserting into food, a temperature sensor for detecting an internal temperature of the food is arranged inside at least the temperature measuring body or the insertion part, a temperature sensing portion of the temperature sensor is fitted to an inner wall of the temperature measuring body or an inner wall of the insertion part, and a control board is arranged in the inner cavity and connected to the temperature sensor, wherein, an inner wall of the temperature measuring body is configured to have an engaging protrusion, the insulating casing includes: a thickening portion at one end of the temperature measuring body, a slim portion connected to one end of the thickening portion and located in the inner cavity when the insulating casing is connected with the temperature measuring body, and a limiting protrusion formed on an outer circumferential surface of the slim portion and is gradually inclined upward along an axis of the slim portion to form an engaging groove between the limiting protrusion and the thickening portion and having an entry opening at one end of the engaging groove and a limiting opening at the other end, and the engaging groove is configured for accommodating and fitting with the engaging protrusion, and the engaging protrusion is positioned in the engaging groove by rotation after entering the inner cavity, and a width of the engaging protrusion is smaller than a width of the entry opening while larger than a width of the limiting opening, so that the engaging protrusion is stopped from further rotation by the limiting opening.

2. The single-pin wireless electronic thermometer of claim 1, wherein a charging contact extending out of the temperature measuring body is connected to an end of the control board away from the insertion part.

3. The single-pin wireless electronic thermometer of claim 2, wherein an antenna module is printed on the control board, and the control board is in wireless connection with a mobile terminal through the antenna module.

4. The single-pin wireless electronic thermometer of claim 3, wherein the antenna module is located at the end of the control board away from the insertion part, and the insulating casing is connected with an end of the temperature measuring body away from the insertion part.

5. The single-pin wireless electronic thermometer of claim 4, wherein the insulating casing is made of a heat-resistant material, and includes an insulating tube integrally connected with the temperature measuring body, and a sealing cover removably connected to an end of the insulating tube away from the temperature measuring body, and the control board extends to an inner wall of the sealing cover and is connected with the sealing cover through the charging contact, and the charging contact extends out of the sealing cover.

6. The single-pin wireless electronic thermometer of claim 5, wherein the insulating casing is removably connected with the temperature measuring body.

7. The single-pin wireless electronic thermometer of claim 1, wherein the insertion part has a hollow tapered structure that is easy to be inserted into the food and integrally connected to the one end of the temperature measuring body, the temperature measuring body and the insertion part are both made of stainless steel.

8. The single-pin wireless electronic thermometer of claim 7, wherein a sensor bracket is further arranged inside the inner cavity at an end close to the insertion part, and a sensor accommodating groove for accommodating the temperature sensor is provided on an outer peripheral surface of the sensor bracket, and the temperature sensor is abutted against an inner wall of the inner cavity through the sensor bracket, and the sensor bracket further includes a cavity to accommodate a power supply module electrically connected with the control board and an end to fix the control board.

9. A charging device for an electronic thermometer, used for charging the electronic thermometer of claim 1, wherein the charging device comprises a charging base and a power supply electrically connected with the charging base; and the charging base has a charging accommodating recess for accommodating the electronic thermometer, and a charging contact for charging the electronic thermometer.

* * * * *